2,959,580
FORMATION OF INCLUSION COMPOUNDS

Hermann Schlenk and Donald M. Sand, Austin, Minn., and Jerry Ann Tillotson, Denver, Colo., assignors to Regents of the University of Minnesota, Minneapolis, Minn., a corporation of Minnesota No Drawing. Filed Oct. 17, 1956, Ser. No. 616,372

8 Claims. (Cl. 260—96.5)

This invention relates to a method of forming inclusion compounds. More particularly, this invention relates to a method of facilitating and expediting the formation of inclusion compounds between host molecules which are known complex formers and guest molecules which normally form complexes with those hosts only with difficulty, if at all.

It has been known that certain unstable compounds can be preserved by including them in complexes. The stabilization of autoxidizable substances in urea complexes is disclosed in a now abandoned United States application Serial No. 189,745, filed October 12, 1950, by Hermann Schlenk, one of the joint inventors of the instant invention, and Ralph T. Holman. This application also describes a method of separating compounds by the use of urea adducts. The stabilization and preservation of similar compounds in carbohydrate inclusion compounds is disclosed in a copending application. Serial No. 512,324 filed by us May 27, 1955 now U.S. Patent No. 2,827,452.

It is paradoxical that, generally speaking, those compounds which are most unstable, and therefore most in need of preservation, are also the most difficult with which to form inclusion compounds. The majority of the substances which need protection and stabilization are unsaturated and their unsaturation acts adversely to inclusion. It has been found that when these materials are initially reacted with a compound having an affinity for inclusion, the substituted portion of the new compound acts as an anchor and serves to bind the entire compound, including the normally non-complex-forming material, in the lattice of the host molecules.

The anchoring radical must not only have an affinity for forming inclusion compounds but its presence on the molecule of the substance desired to be protected or preserved must not materially alter the desirable characteristics of the included substance.

The principal object of this invention is to provide a method of forming inclusion compounds wherein a difficultly includable guest molecule is anchored in a host molecule by initially coupling the guest molecule with an easily included anchoring molecule without materially altering the characteristics of the guest.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly stated, this invention comprises a method of anchoring a difficultly includable unstable guest material in the open lattice-work of a known complex-forming host substance to form a stable inclusion compound or complex by first reacting the unstable material with another compound to add to the unstable guest material a substituent substance having an affinity for forming inclusion compounds with the selected host, but without materially changing the desirable useful physical or chemical properties of the guest material, and then reacting the anchor-substituted guest with the complex-forming host in amounts and under such conditions as to form stable complexes or inclusion compounds.

The materials which are desirably included as guest compounds for the most part are organic chemical substances which are subject to spontaneous physical or chemical change. The resultant preservation and stabilization of the qualities of the organic compounds may be utilized during the processing, handling and storing of the organic compounds before final use. It is applicable not only to bulk materials but also on a small scale when the stabilization of some ingredient mixed with bulk material is desired.

The type of organic chemical compound to which the procedure is applied is limited in practical application of the invention to those which are subject to autodeterioration or autochange by autoxidation, radiation, polymerization and the like upon standing or in storage. By "autodeterioration" and "autochange" are meant phenomena which are spontaneous or self-occurring such as result from normal storage or exposure to the atmosphere under normal conditions and the like, such as autoxidation, volatilization, and the like.

Inclusion compounds are a special type of complex. They provide a means by which one compound can be bound with another suitable chemical without changing the chemical character of either. The molecules are unaltered in their chemical nature. The individual compounds can be reconstituted and readily isolated where the presence of the complexing agent interferes with the ultimate use of the bound material.

Inclusion of organic molecules by complex-forming agents like urea, thiourea, cyclodextrins, starch, or desoxycholic acid, requires an architectural fit of the components forming an inclusion compound. The well-known separation of straight-chain molecules from molecules having branched chains or from cyclic compounds by means of urea adduct formation is the most convincing demonstration of this principle. Urea can adapt only straight chains, and therefore crystallizes almost exclusively with them. Thiourea shows a similar selectivity, reacting easily with cyclohexane or branched-chain molecules but not with straight-chain molecules. Alpha-cyclodextrin easily yields a complex with p-iodobenzoic acid, but reacts with O-iodobenzoic acid only with great difficulty. The former acid can be considered a straight-chain in contrast to the latter, which has a much more bulky shape, obviously hindering complex formation.

Advantage has been taken of these characteristics in many separation procedures where some of the constituents of a mixture are not able to react with a complex former. There may be several advantages, however, in preparing inclusion complexes with molecules that are usually not able to undergo such reactions. The advantages lie in certain properties to be expected from such complexes, namely stabilization against autoxidation, polymerization, deterioration by light, volatilization, and against any physical or chemical change involving chain reaction mechanism solubilization of materials, the slow release of materials used for biological purposes and the like. A method is described here by which molecules inert to a complexing reagent can be induced to form complexes. The principle is most descriptively termed an anchoring of the molecules in the structure of the complexing host.

It has been mentioned that cyclohexane is a very good reactant with thiourea. Fatty acids, their methyl or ethyl esters, are straight-chain compounds and therefore do not react with thiourea.

The invention relates to complex formation with molecules that must be considered as unable to undergo inclusion or which undergoes inclusion only with difficulty. A structure is introduced which does not essentially change the valuable and desirable properties of such molecules, but which enables them to react with the complex-forming reactant. Being anchored in this way, the compound shows all the desirable features of an inclusion complex.

As an illustration of the anchoring concept of this invention, thiourea is a low priced industrial product and therefore is a preferential host for protection of bulk materials for industrial use. Thiourea is known to be a typical reagent for adduction with branched or cyclic carbon structures, such as cyclohexane, but not with straight-chain molecules. Accordingly it is impractical, if not impossible, to prepare thiourea adducts of straight-chain compounds, such as unsaturated fatty acids, their methyl or ethyl esters or the like.

Thus, to include natural mixtures of straight-chain compounds or pure straight-chain compounds in thiourea, for the purpose of separation or stabilization, they are reacted with another material in order to add a branched chain or cyclic substituent having an affinity for inclusion in thiourea. If the guest substance is an unsaturated fatty acid or mixture of unsaturated fatty acids the substituent may be added by esterifying the acids with a branch chain or cyclic alcohol without substantially changing the useful properties of the unsaturated acid material. For example, cyclohexyl esters may be formed. When a cyclohexane ring is introduced into the fatty acid molecule (by forming its cyclohexyl ester) the tendency of the cyclohexane ring to react with thiourea is preserved, and as a result the fatty acid molecule is taken up by and anchored in the thiourea structure. The complex exhibits all the properties to be expected from such adduct, such as stability, and at the same time, the characteristic features of the lipids, for example their unsaturation, are maintained.

The anchoring of fatty acids in thiourea is further illustrated by the following examples:

Example I

Cyclohexyl esters of fatty acids were prepared from commercial corn oil by means of alkaline interesterification. Thirty grams of such esters were added to a warm solution of 90 g. thiourea in 900 ml. methanol. After cooling slowly and crystallizing at 4°, the precipitate was filtered off and dried. It weighed 56.2 g. and contained 27% esters. This represents the majority of the stearic acid and part of the oleic acid esters present in the corn oil mixture. In order to obtain the more unsaturated fraction of linoleic acid ester, 60 g. of thiourea were added to the mother liquor. After crystallization at 4°, the solid product was filtered off and washed with cold methanol. It weighed 57.7 g. and contained 20% esters. The recovery of esters from this product is carried out by addition of dilute aqueous hydrochloric acid, and extraction of the lipid with ether. The autoxidation test was carried out in Warburg vessels immersed in a 37° C. bath and flushed with pure oxygen for 4 minutes before being closed. The oxygen uptake was measured manometrically. Ester (100 mg.) recovered from this latter fraction took up 2880 microliters of oxygen within 77 hours. The rate of autoxidation still increased after that period. Adduct equivalent to an amount of 60 mg. esters did not take up any oxygen. It released 372 microliters of gas within 50 hours and remained constant from there on until the test was finished after 140 hours.

Example II

Cyclohexyl esters of fatty acids were similarly prepared from commercial cottonseed oil. Thirty grams of such esters were added to a solution of 90 g. thiourea in 900 ml. methanol. After cooling and crystallization the precipitate was filtered off. It was composed of a thiourea-cyclohexyl ester adduct. An additional 60 g. of thiourea was added to the mother liquor and an additional fraction was obtained by cooling and crystallization consisting of adduct and free thiourea.

Similarly, urea is a readily available and low cost material useful for industrial purposes in the protection of bulk materials. However, urea is known to readily form adducts only with straight-chain molecules. For this reason it is not feasible to prepare urea inclusion compounds with cyclic or branched-chain compounds.

If for some reason it is desired to protect a cyclic or branched material in an inclusion compound and the use of a ready complex former for such material, such as thiourea, is contraindicated, the cyclic or branched material can be made to form an adduct with urea according to the teachings of this invention. The normally non-includable substance is anchored into the lattice of urea by first reacting it with a material to add a long straight-chain substituent on the cyclic or branched substance. Thus, for example, a cyclic alcohol, which normally will not form an adduct with urea, is reacted with a straight-chain fatty acid, and thereafter is readily included in urea. Cyclohexanol cannot be reacted with urea, but when esterified with straight-chain fatty acids, particularly with palmitic or stearic acids, it is taken up by the hexagonal urea complex structure, and a normal complex is obtained.

The anchoring principle is demonstrated for urea by the following:

Example III

Thirty grams of mixed fatty acid cyclohexyl esters, principally cyclohexyl palmitate and cyclohexyl stearate, prepared from cottonseed oil, were reacted with 90 g. urea in 300 ml. methanol. After heating and crystallization at room temperature, the precipitate was filtered and washed with methanol. 63.2% of the fatty acids were bound in the complex which had a composition of 74% urea and 26% fatty acid cyclohexanol esters. This corresponded to the ratio expected for such a compound. Further analysis of the lipid revealed that the saturated acid esters were bound preferentially.

These principles are further illustrated by the following four examples:

Example IV

Isobutyl esters of cottonseed fatty acids were prepared by catalytic interesterification of cottonseed oil in isobutyl alcohol in the presence of sodium isobutylate. The esters were purified from alkali and glycerol in the usual manner by washing them with water and drying over anhydrous sodium sulfate. They were straight-run distilled without any fractionation being attempted. The product consisted of the iso-butyl esters of palmitic, stearic, oleic, and linoleic acids as the major components. 20 g. of this material was reacted with 90 g. thiourea in 300 ml. methanol by heating the mixture shortly to reflux and subsequent storage for crystallization at room temperature. The crystalline complexes were collected by filtration. The amount was 61.5 g. adduct containing 11.3 g. of esters characterized by iodine value of 76. The complex product contained 18.3% ester, a composition corresponding to that of the regular adducts of thiourea with other organic materials.

Cottonseed fatty acids and their methyl or ethyl esters do not react with thiourea and cannot be obtained in thiourea complex form. Isobutyl alcohol, on the other hand, does not react with urea. Substituted with fatty acids in the form of fatty esters, urea complexes can be obtained.

Example V

Twenty grams of the mixed isobutyl esters described in Example IV was reacted with 80 g. urea in 300 ml. methanol in the usual manner by heating and cold crystallization. Urea complexes deposited and were filtered off. 40.8 g. material was collected having an ester content of 24.6%. This composition and also other properties corresponded well with the conventional urea inclusion complexes.

Example VI

Tertiary butyl esters of cottonseed fatty acids were prepared and purified by the procedure outlined in Example IV, using tertiary butyl alcohol instead of isobutyl alcohol. Twenty grams of this material was reacted with 30 g. thiourea in 300 ml. methanol, and the crystals formed at 2° C. were collected. They contained 24.6% esters, characterized by iodine value of 64. Twenty-six percent of the original material had been bound in thiourea complex form. Again the substitution with the branched alcohol, in this case, tertiary-butyl alcohol, enabled inclusion of fatty acids which otherwise would not have reacted with thiourea.

Example VII

When 20 g. of tertiary-butyl fatty ester were reacted with 120 g. urea in 300 ml. methanol, a precipitate was collected consisting of urea and urea complexes of fatty acid ester. Tertiary-butyl alcohol cannot be brought to react with urea except in the form of its long chain fatty acid esters. The solids contained 15.5% of the original esters and their composition was 4.5 parts ester bound with 95.5 parts urea. Since the composition of pure urea complexes with lipids is generally 25 to 75 parts, it is concluded that the complex formed in this reaction is contaminated with urea that had been used in excess.

Vitamin A is a highly unsaturated primary alcohol containing a cyclohexene ring. Although vitamin A alcohol forms adducts, as for example with carbohydrates such as amylose and beta-dextrin, the unsaturation in the molecule acts adversely to inclusion by limiting adduct formation. Esterification to add a saturated straight-chain substituent promotes and facilitates formation of inclusion compounds.

Amylose when reacted with vitamin A alcohol formed an inclusion compound containing only 0.89% vitamin A alcohol. In another portion of the same starch solution the addition of a short straight-chain saturated substituent in vitamin A acetate resulted in inclusion of 1.65% of the ester, an increase of 85% over the alcohol. This is illustrated by the following two examples:

Example VIII

Crystalline amylose was obtained by precipitation with n-amyl alcohol. It was steam distilled to remove the alcohol and adjusted to a volume of 110 ml. which contained 7.2 g. amylose. To the hot solution 20 ml. of 2 N KOH were added. Fifty-five ml. of this solution were diluted with water to 110 ml. volume. Vitamin A alcohol (0.3 g.) was dissolved in 10 ml. ethanol and added under shaking. The mixture was neutralized to pH 6.0 with acetic acid. After 5 hours shaking it was centrifuged and the solids were dried over KOH in high vacuum. The dry material was ground in a mortar and extracted with carbon tetrachloride. This solvent removes excess vitamin which has not been bound but cannot extract vitamin that is included by the solids. The yield of dried and washed stable complex was 2.28 g. which contained 0.89% vitamin A alcohol.

Example IX

Fifty-five ml. of the starch solution described in Example VIII was diluted to a total volume of 110 ml. and in the same procedure 0.3 g. vitamin A acetate were reacted with the starch. The yield was 2.2 g. of stable starch complex containing 1.65% vitamin A acetate, an 85% increase over the vitamin A per se.

The process of this invention is characterized by the following criteria:

(1) The potential guest molecule is one which is in need of protection. That is, it is an organic chemical substance which, because of its structure, may be subject to autodeterioration or autochange, such as polymerization, volatilization, autoxidation or the like, if left unprotected.

(2) The potential guest compound is not normally readily includable in the selected host.

(3) The selected host compound is one which does not normally form inclusion compounds readily with the material to be protected.

(4) The selected anchoring substituent must be one which has an affinity for forming complexes or inclusion compounds with the selected host compound.

(5) The anchoring substituent must be inert with respect to the guest molecule to the extent that the desirably useful properties of the guest molecule are maintained substantially intact in spite of the presence of the anchor. For example, the desirable anti-infective, growth promoting and anti-xerophthalmic properties of vitamin A are substantially unchanged when vitamin A is esterified to add an anchoring substituent, such as the acetate or palmitate radicals. Likewise, for example, the desirable nutritive properties of essential fatty acids remain substantially intact when the acids are esterified to provide anchoring substituents.

In each case the complexes are formed by admixing the reactants, that is, the host complex-former and the guest with the attached anchoring substituent, in a solvent for one of the compounds, either the host or the guest. Preferably, a mutual solvent is used. A pre-complex formation takes place in solution. Although pre-complexing takes place in most instances by stirring the ingredients at room temperature dissolution of the materials is often accelerated and consequently pre-complex formation is promoted by the use of elevated temperatures up to about 60 to 70° C. No complex is formed above these temperatures. In most instances the complex precipitates as crystals upon cooling to room temperature or below. The precipitant is separated by decantation, filtration, centrifugation or the like and then dried.

The capacity of the host molecule to receive a guest molecule is dependent upon the spaces within the host molecule. That is, the amount of material which can be bound and protected is determined volumetrically. Accordingly no fixed ratio between the host and guest molecule can be stated. When the guest molecules are of materials having a density of about one, it may be stated as a general rule that starches will bind up to about 8% of their own weight of a guest compound and dextrins will receive up to about 10%. The mechanism is comparable to filling a box or can or similar container. The container will not hold more than its maximum capacity although it may be filled with any lesser amount.

Where maximum utilization of the protective and stabilizing characteristics of the complex is to be achieved the complex is initially formed with an excess of the guest compound in order to include as much of the guest as possible. When this is done, in many instances, part of the excess guest material clings to the outside of the crystalline complex. Only the material which is included is protected so that for optimum protection the complex should then be purified by heating to drive off the excess guest material. This is preferably done under high vacuum.

On the other hand, when something less than maximum utilization of the protection afforded by the inclusion compounds is not objectionable the complex may be initially formed without an excess of the guest molecule in order to avoid the necessity for distillation. In each instance the capacity of a particular complex forming carbohydrate host molecule for any particular guest can be determined empirically by initially attempting to react a large amount of the guest compound, purifying the resulting complex and then isolating the material which was bound.

It is apparent that many modifications and variations of this invention as hereinbefore set forth may be made without departing from the spirit and scope thereof. The specific embodiments described are given by way of example only and the invention is limited only by the terms of the appended claims.

What we claim is:

1. A method of promoting the formation of inclusion compounds between a host material known to be a complex former with straight carbon chain structures and an organic chemical guest compound selected from the group consisting of branched carbon chain structures more highly branched than monomethyl branched and cyclic carbon structures, normally only difficultly includable in the complex-forming host molecule, which method comprises initially reacting said guest compound to add onto the guest molecule a straight carbon chain anchoring substituent while maintaining the desirably useful properties of the guest compound substantially intact, and then reacting this newly formed substance with the complex forming material to form a stable inclusion compound.

2. A method according to claim 1 further characterized in that the complex forming host material is urea.

3. A method according to claim 2 further characterized in that the guest compound is an alcohol selected from the group consisting of branched chain and cyclic alcohols.

4. A method according to claim 3 further characterized in that the anchoring substituent is a straight-chain fatty acid radical.

5. A method according to claim 3 further characterized in that the guest compound is selected from the group consisting of isobutyl alcohol, tertiary butyl alcohol and cyclohexanol.

6. A method according to claim 4 further characterized in that the anchoring substituent is a fatty acid radical selected from the group consisting of stearic, palmitic, oleic and linoleic acids.

7. A method of promoting the formation of stable inclusion compounds between urea and an organic chemical substance selected from the class of branched carbon chain and cyclic structures consisting of isobutyl alcohol, tertiary butyl alcohol and cyclohexanol which is normally difficult to include in urea as a guest molecule, which method comprises initially reacting the said guest compound with another chemical substance selected from the group consisting of stearic, palmitic, oleic and linoleic acids to add onto the guest molecule a straight-chain anchoring substituent having a known affinity for forming inclusion compounds with urea while maintaining the desirably useful properties of the guest compound substantially unchanged and then reacting the resulting ester with urea to form a stable inclusion compound.

8. A method of promoting the formation of inclusion compounds between a complex-forming host molecule known to react with straight carbon chain structures and an organic chemical substance subject to autodeterioration and autochange which is normally difficult to include in the complex-forming host molecule as a guest molecule, said guest molecule being composed predominantly of a structure selected from the group consisting of branched carbon chain structures more highly branched than monomethyl branched and cyclic carbon structures, which method comprises initially reacting the guest compound with another chemical substance to add onto the guest molecule as an anchoring substituent a straight carbon chain radical having a known affinity for forming inclusion compounds with the complex-forming host compound while maintaining the desirably useful properties of the guest compound substantially unchanged and then reacting this newly formed substance with the complex-forming host material to form a stable inclusion compound.

References Cited in the file of this patent

UNITED STATES PATENTS

| | | |
|---|---|---|
| 2,020,685 | Izard | Nov. 12, 1935 |
| 2,594,481 | Bowman et al. | Apr. 29, 1952 |
| 2,596,344 | Newey et al. | May 13, 1952 |
| 2,642,424 | Gorin et al. | June 16, 1953 |
| 2,727,025 | Weitkamp | Dec. 13, 1955 |
| 2,756,222 | Swern et al. | July 24, 1956 |
| 2,774,752 | Gorin et al. | Dec. 18, 1956 |
| 2,830,039 | Weitkamp et al. | Apr. 8, 1958 |